Oct. 28, 1952　　A. B. HILDEBRANDT　　2,615,248
TRUE DIP DETERMINING APPARATUS FOR WELL LOGGING
Filed April 21, 1951　　3 Sheets-Sheet 1

Alexander B. Hildebrandt  Inventor
By W. O. T Heilman  Attorney

Oct. 28, 1952     A. B. HILDEBRANDT     2,615,248
TRUE DIP DETERMINING APPARATUS FOR WELL LOGGING
Filed April 21, 1951     3 Sheets-Sheet 2
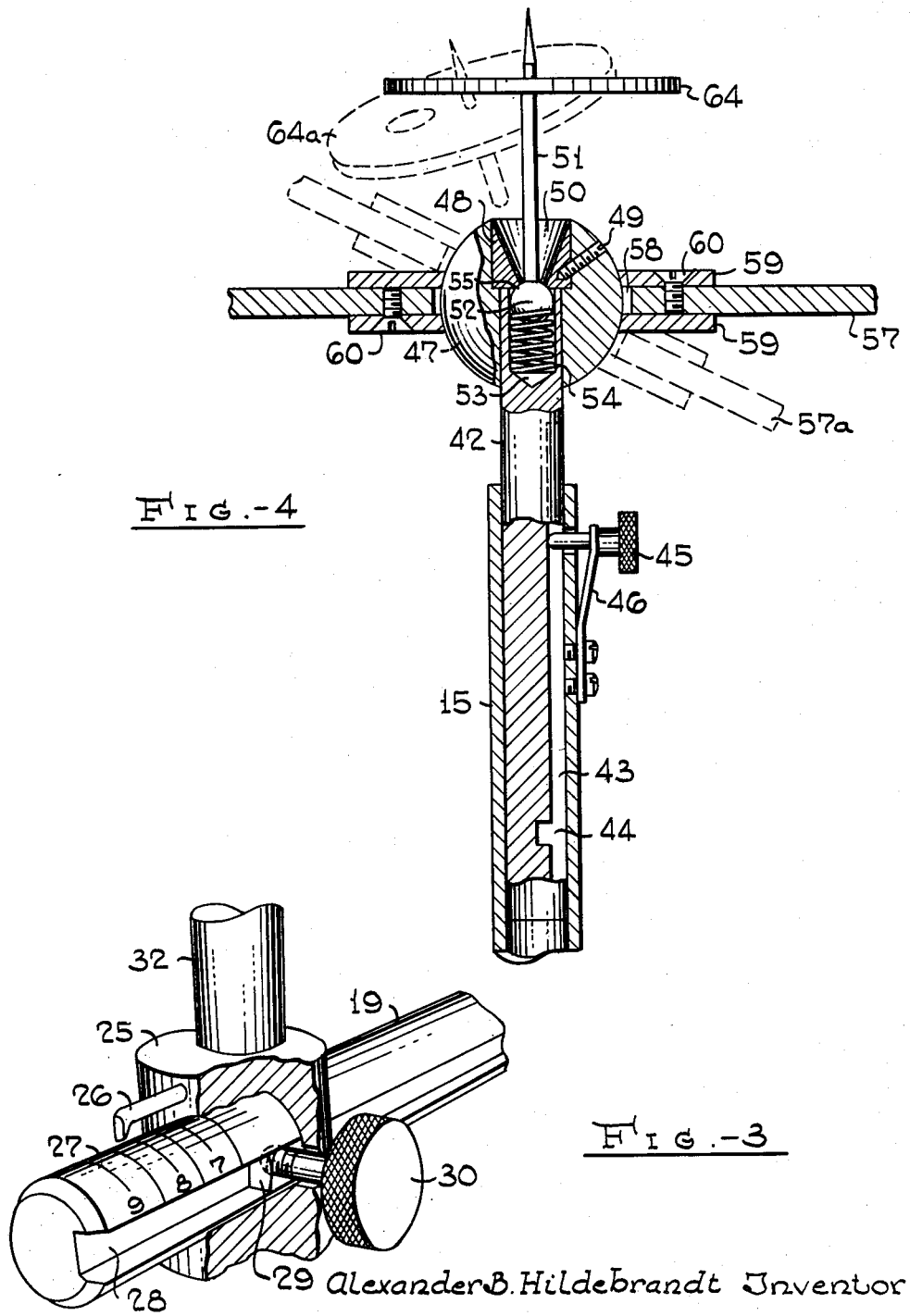

Oct. 28, 1952 A. B. HILDEBRANDT 2,615,248
TRUE DIP DETERMINING APPARATUS FOR WELL LOGGING
Filed April 21, 1951 3 Sheets-Sheet 3

Alexander B. Hildebrandt Inventor
By W. O. Heilman Attorney

Patented Oct. 28, 1952

2,615,248

UNITED STATES PATENT OFFICE 2,615,248

TRUE DIP DETERMINING APPARATUS FOR WELL LOGGING

Alexander B. Hildebrandt, Tulsa, Okla., assignor to Standard Oil Development Company, a corporation of Delaware Application April 21, 1951, Serial No. 222,239

6 Claims. (Cl. 33—1)

The present invention concerns apparatus for determining the true dip of subsurface strata encountered in a borehole by a well logging instrument. More particularly the invention relates to an apparatus that will establish three points in space having the same relative positions as three points of a stratum in a subsurface formation and that will determine the attitude of a plane passed through these three established points in order to ascertain the true dip and strike of the subsurface stratum.

Many methods have been devised for obtaining information from each new area that is explored in the constant search for new sources of crude oil. Since these methods all involve considerable time and effort, it is desirable to obtain as much information as possible from each locality that is studied. One valuable source of information regarding the geological structure of a particular area is the borehole obtained when an oil well is being drilled. Cuttings removed from the borehole during drilling are examined closely and core samples are taken at selected intervals to determine the nature of the strata encountered. Then when the drilling has been completed the well bore itself is usually subjected to intensive study by one or more of numerous methods that are referred to broadly as well logging methods. Some of these methods involve determination of the dip and strike of strata traversed by the borehole.

The dip of a stratum is defined as the dihedral angle formed by the plane of the stratum and a horizontal plane, and the strike of a stratum as the direction, with respect to the compass, of the line formed by the intersection of the plane of stratification with a horizontal plane. The orientation of a stratum in terms of dip and strike is of considerable value in establishing the general geologic nature of the earth in the area being studied and is useful in predicting the existence of oil deposits and their possible extent.

A basic principle that may be employed for determining dip when profiling a borehole is that the diameter of a borehole will vary more or less in proportion to the nature of the strata. In general this results from the fact that preferential erosion of the various types of strata occurs as the hole is drilled, inasmuch as the different types of sedimentary rocks vary in brittleness and in the eroding effect of the drilling mud on them. Thus, for example, it is known that a shale stratum will give a wider hole than an adjacent sandstone or limestone when drilling a hole of a given size and that, if such a hole is traversed with a profiling instrument, the recorded profile will show good definition between two different kinds of strata, particularly between a shale and either a limestone or a sandstone. This phenomenon is known to occur consistently.

The variation in diameter of a borehole as a function of the type of strata encountered enables one to ascertain the dip and strike of the strata, as will now be explained. Thus, if a measuring device is passed through the borehole to determine the diameter of the borehole accurately along the length of the borehole, it is possible to identify changes in the strata through which the borehole passes. If this same type of measuring device is modified so as to maintain the device in essentially a central position at all times, and if a plurality of measuring devices arranged in a horizontal plane are used to measure the variation in the distance of the walls of the borehole from its center, it is possible to determine the inclination of the various strata at particular points in the borehole.

The simplest illustration of the principle involved can be presented by imagining a measuring device having two profiling arms pivotally attached to the device on opposite sides thereof, the contact points of the profiling arms being in a horizontal plane. As will presently be pointed out, for practical purposes it is necessary to have at least three profiling arms, but for simplicity of the present explanation two arms are imagined. Now, as the measuring device is lowered or raised in the borehole, assuming the device to be centered properly in the hole, one profiling arm will move inwardly or outwardly, due to a change in diameter of the bore hole caused by a change in strata, before the other profiling arm will make a similar movement, provided the plane of stratification is inclined and provided the vertical plane in which the two profiling arms lie is perpendicular to the line of strike of the particular stratum. It is then a simple matter to determine the angle of inclination or dip of the particular stratum from the measured vertical distance between the points of contact of each profiling arm with the stratum and the measured diameter of the borehole at these points of contact.

It is apparent from the above that valid measurements can be made only in a case in which the two profiling arms are oriented in a plane perpendicular to the line of strike. Since the direction of strike of underlying strata is one of the unknown pieces of information that it is desired to obtain, it is obvious that an instrument with only two profiling arms would not be practicable unless the instrument were run up and down the hole several times with the profiling arms oriented in a different azimuthal direction each time. If, however, an instrument is used having at least three profiling arms equally spaced around the circumference of the borehole and having associated therewith means for orienting one of the profiling arms with respect to the compass, sufficient information can be obtained with one traverse of the borehole to enable a computation of both the dip and strike of strata through which the borehole passes.

In accordance with these principles, therefore, the dip and strike of strata traversed by a borehole can be determined by logging the borehole with an instrument comprising the following components: Three or more uniformly spaced profile measuring devices together with centering and guiding means to maintain the apparatus in substantially the center of a borehole and to maintain the apparatus in alignment with the borehole; an orienting device that will determine the azimuthal orientation of the apparatus; and an inclination detector to determine the inclination of the apparatus from the vertical in the event that it is not in a vertical position. This entire apparatus is to be lowered into a borehole by means of a cable associated with a suitable measuring device to determine the depth of the apparatus in the borehole. The cable also includes electrical conductors suitably connected to the profile measuring devices, orienting device, and inclination device so as to permit recording on the surface of the earth of all necessary information in order that the dip and strike of strata traversing the borehole can be accurately determined. A suitable instrument of this type is described and claimed in co-pending application Serial No. 90,324, of Frank G. Boucher, filed April 29, 1949, for Oriented Dip and Strike Indicator For Bore Holes.

One suitable computing device that can be employed to determine the apparent dips of substrata from a record chart obtained with a well logging instrument of the type just described is disclosed and claimed in co-pending application Serial No. 164,308, of Alexander B. Hildebrandt and Leroy W. Ledgerwood, Jr., filed May 26, 1950, for Well Logging Apparent Dip Computer, Patent 2,592,422 granted April 8, 1952. This particular computing apparatus is so designed that into it can be indexed the indicated displacement from the center of a borehole of at least three circumferentially spaced profiling arms, the indicated vertical distance between the points of contact of each profiling arm with a particular subsurface stratum and the indicated orientation of one of the profiling arms with respect to the compass, so that after proper manipulation of the instrument the magnitude and direction of the dip of a particular stratum can be read directly from a scale on the computing device. However, this apparatus suffers from the disadvantage that the inclination of the well logging instrument in the borehole and the deviation of the borehole from the vertical are ignored, so that what is obtained is the apparent dip rather than the true dip of the stratum measured and it is then necessary to make an additional calculation to determine the dip as related to a true vertical, i. e. the true dip.

One object of the present invention is to provide an apparatus that can be employed to compute the true dips of subsurface strata from a record chart obtained with a profiling type of well logging instrument such as that described above. It is a further object of this invention to provide a computing apparatus that will determine the true magnitude and direction of the dip of a particular stratum from well logging data that indicate the displacement from the center of a borehole of at least three circumferentially spaced profiling arms, the indicated vertical distance between the points of contact between each profiling arm with a particular stratum, the indicated orientation of one of the profiling arms with respect to the compass, and the detected deviation of the profiling instrument from the vertical.

Other objects of the invention as well as the particular nature of the computing apparatus and the manner in which it is to be employed can be ascertained from the ensuing description and from the accompanying drawing in which:

Fig. 3 is a fragmentary view showing details of the displacement rider locking assembly;

Fig. 4 is an enlarged elevational view, partly in section, of the upper portion of the mast and azimuth plate assembly;

Figure 1:
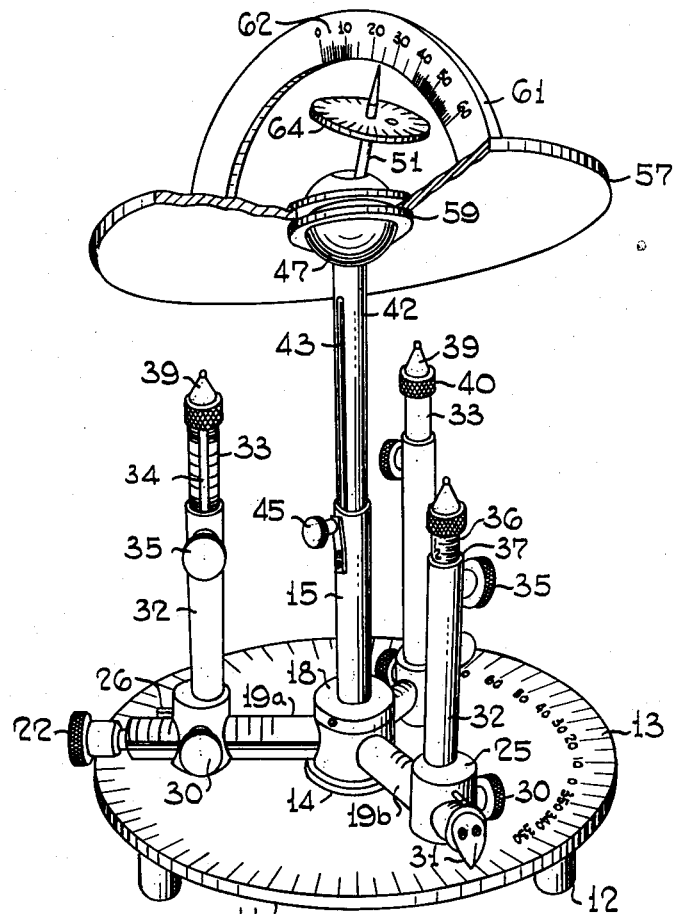
Fig. 1 is an elevational perspective view of the apparatus with a portion cut away for clarity of illustration.
Figure 2:
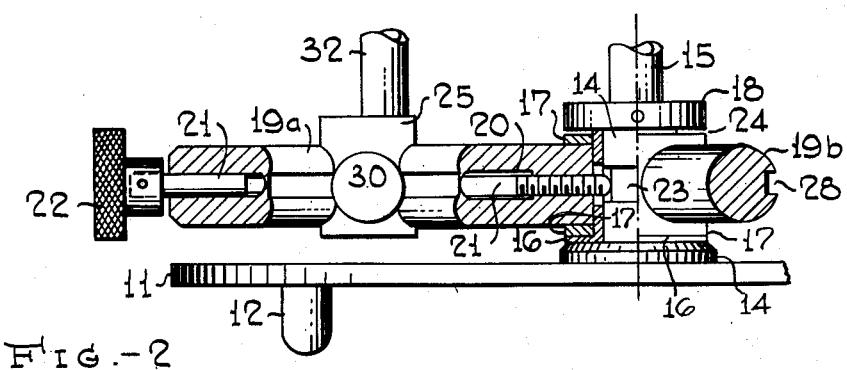
Fig. 2 is an elevational view, partly in section, showing details of the locking mechanism for the radius beam assembly.

With particular reference to Figs. 1, 2 and 3, it will be seen that the apparatus has a flat circular base 11 supported on legs 12. A circular scale or compass rose 13 marked off in angular degrees is provided on the upper side of base 11. In the center of the base is a flanged bearing 14 to which is rigidly attached a vertical hollow shaft 15. Conveniently, bearing 14 and shaft 15 may constitute a single piece of material. Rotatably supported on bearing 14 is a flanged bushing 16 to which is attached a hub 17. Preferably bushing 16 is self-lubricating and may comprise, for example, oil-impregnated porous bronze. The bushing and hub assembly is held in place by collar 18. At radially spaced intervals three radius beams 19 are supported horizontally by hub 17. In Fig. 2 a portion of radius beam 19a is shown in broken section of the left of the vertical center line of bearing 14 and shaft 15 to illustrate the locking mechanism for the radius beam assembly. It will be seen that this radius beam is provided with a threaded hole 20 into which is fitted a threaded rod 21 which can be turned by knob 22 so that the rounded end of rod 21 can press against the bearing 14 to prevent rotation of hub 17. Preferably a groove 23 is provided in the bearing to prevent or minimize damage to bushing 16 by metal particles that may be turned up or worn off by rod 21. It should also be noted that preferably bushing 16 is of sufficient height so that collar 18 will not rest directly on top of bearing 14 but will define therewith a small clearance 24 to minimize frictional forces.

Slidably fitted on each of the radius beams 19 is a rider member 25 provided with a pointer 26 to indicate on scale 27 the longitudinal displacement of the rider from the center of the instrument. A groove 28 is cut into the side of radius beam 19 to receive a rider key 29 which is threaded to receive the threaded shaft of a locking knob 30 that fits through a suitable opening in rider 25. The key and locking knob assembly prevents rotation of rider 25 about radius beam 19 and also permits locking of the rider at a selected position along the beam.

Vertically supported on each of the riders 25 is a displacement rider tube 32 that slidably receives a rider shaft 33. Each of the shafts 33 has a groove 34 cut in one side to accommodate a key (not shown) similar to the rider key 29 so as to provide for locking the shaft 33 at a selected height by means of locking knob 35. Each of the shafts 33 carries a scale 36 to indicate the vertical displacement of the shaft relative to a reference point, which for example may be the top ledge 37 of tube 32. The upper end of each of the shafts 33 is tapped to receive a threaded tapered tip 39. The purpose of having tips 39 threaded is to provide for proper zero adjustment of the effective length of shafts 33 as measured by scales 36. The knurled collars 40 on the upper ends of shafts 33 facilitate grasping of the latter for raising and lowering the same.

Referring now particularly to Fig. 4 it will be seen that hollow shaft 15 slidably receives a mast 42 having a groove 43 cut in one side into which fits the end of a latch member 45, the latter being urged inwardly by spring 46. A notch 44 near the lower end of groove 43 enables latch 45 to hold mast 42 in an upper position to facilitate setting of the riders and rider shafts as will be explained more fully hereinafter.

The upper end of mast 42 fits into an appropriate cavity in a ball 47. The upper side of the ball is also provided with a recess into which fits a block 48 having a conical or frustro-conical recess 50. A pointer member 51 sets into recess 50 and terminates at its lower end in a spherical shaped portion 52 of sufficient diameter to retain it in place in recess 53 in the top of mast 42. A spring 54 holds the spherical section 52 against shoulder 55 at the junction of recesses 50 and 53, the spring having sufficient tension to hold pointer member 51 in a fixed position relative to ball 47 until the pointer is moved by hand. To facilitate assembly and permit replacement of spring 54, block 48 is removable and is held in place by set screw 49.

A circular dip plane plate 57 provided with a central opening 58 of sufficient size to permit ball 47 to pass therethrough is movably held for semi-universal manipulation about the ball 47 by retaining rings 59 in such a manner that the center plane of the plate 57 will pass through the center of ball 47 regardless of the position of the plate. Conveniently the plate and ring assemblies 57 and 59 are held together by screws 60 which pass through holes in the rings and engage threaded openings in the plate. For mechanical reasons it is preferred that odd number of screws 60 be set in each of the rings 59 and that the screws on one of the rings lie on lines bisecting the projected angles defined by adjacent screws on the other ring. For example, in the embodiment shown, each ring has three screws and the screws of the top ring are displaced 60° angularly from the screws in the bottom ring.

A semicircular flat ring 61, which may be referred to as a dip angle scale plate, is attached to dip plane plate 57 so that it lies in a plane that is perpendicular to the plane of plate 57 and that passes through a center line of plate 57. A dip angle scale 62 is marked off in degrees on one-half of dip angle scale plate 61.

Figure 5:
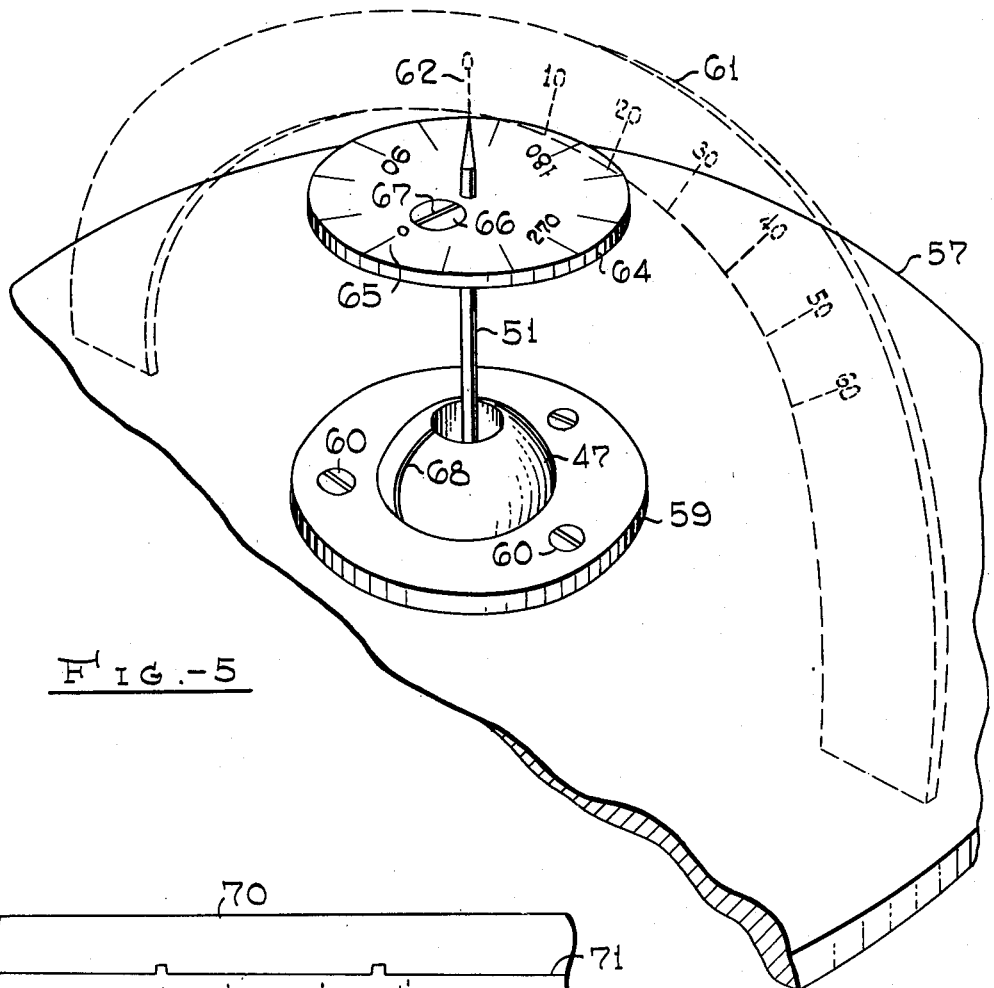
Fig. 5 is a broken perspective top view of the azimuth plate and pointer, illustrating one means for aligning a reference mark on the plate with a reference mark on the base of the instrument.

Adjacent the top end of pointer 51 and at right angles to the pointer is attached a circular azimuth plate 64 carrying an azimuth scale on its periphery. As shown in Fig. 5, an opening is provided in plate 64 into which is set a sight hole disc 66 made of suitable transparent material, e. g., glass or plastic. A line 67 is scribed on disc 66 in alignment with the zero mark on scale 65. By sighting down through disc 66 the operator of the instrument can place line 67 in alignment with a line 68 on ball 47 as will be explained hereinafter. It will be noted that the tip of pointer 51 can be moved to positions adjacent dip angle scale 62.

Figure 6:
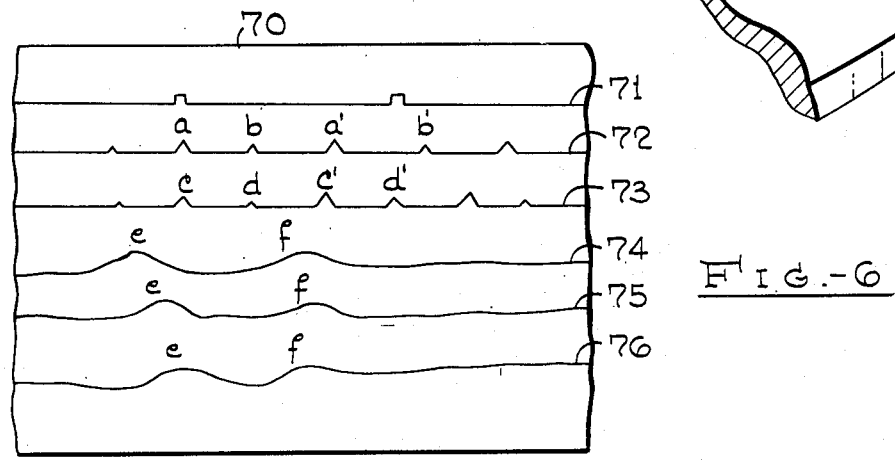
Fig. 6 illustrates a portion of a typical record chart from which values can be taken for use with the apparatus of this invention.

The function of the computing device as described above will now be explained. In Fig. 6 is shown a portion of a typical record obtained with a well logging device having three uniformly spaced profiling arms together with an orientation device and an inclination detector as mentioned previously. The chart paper 70 carries a plurality of traces showing the fluctuations of recording galvanometers controlled by the profiling arms, orientation device and inclinometer. In addition to these traces a record of the depth of the well logging apparatus in the bore hole is also made, the markings produced being indicated by the line 71. The notches in line 71 appear periodically to indicate distances on the record paper corresponding to a given depth of the instrument in the well. For example, a notch will appear for each 10 ft. the apparatus travels up the bore hole. Line 72 depicts a representative trace obtained with the inclinometer unit and line 73 represents the type of trace produced by the orientation detector. Preferably, for ease of calculation, chart paper 70 is moved past the recording galvanometers at a speed proportional to the logging speed, i. e., the speed of travel of the well logging instrument through the borehole when the log is being made.

As described fully in the aforementioned copending application of Frank G. Boucher, Ser. No. 90,324, filed April 29, 1949, the inclination of the instrument in the borehole can be determined by relating the distance between kicks $a$ and $a'$ and between kicks $a$ and $b$ on line 72. Similarly, as described in the Boucher application just referred to, the orientation of one of the profiling arms with respect to a selected point on the compass can be determined from the relative positions of kicks $c$ and $d$ on trace 73. Suitable apparatus for measuring inclination and orientation wherein traces of this character are produced are also described and claimed respectively in copending applications, Ser. No. 72,515, of Alexander B. Hildebrandt, filed January 24, 1949, for Inclinometer For Bore Holes, and Ser. No. 123,892, of Frank G. Boucher and Alexander B. Hildebrandt, filed October 27, 1949, for Remote Reading Compass Unit.

Having now established from the record of Fig. 6, the depth of the apparatus, the orientation of the profiling arms, and the inclination of the apparatus, it remains only to interpret the records of the profiling arms indicated by traces 74, 75 and 76. These lines represent a profile of the borehole traced by each of the three arms. It will be noted on the record that two erosion-resistant strata are indicated. Because of the sequence in which the profiling arms touched the strata, it appears that the uppermost stratum indicated by waves $e$ is slightly inclined, while the stratum indicated by waves $f$ is in essentially the same plane as the three arms. It must be remembered, of course, that the inclination of the well logging device in the hole must be accounted for in determining the actual incline of each stratum so that the stratum indicated by traces $f$ is not necessarily horizontal but lies in the plane through the profiling arms determined by the inclination of the apparatus at the depth indicated.

For an accurate determination of the dip and strike of strata from a record such as that represented by Fig. 6, the following principles may be employed. The vertical distance between the points of contact of the profiling arms of the well logging instrument with a particular stratum may be found by referring to the depth markings shown by trace 71. The distance of each arm from the center of the well logging instrument to the point of contact with the particular stratum may be found from the amplitude of the trace, the record having been suitably calibrated for this purpose. Thus vertical reference lines may be drawn on the record adjacent the actual trace drawn by the recording means of the galvanometer associated with each profiling arm to show the actual extension of the arm. By also knowing the orientation of each of the profiling arms as ascertained from trace 73 and the inclination of the apparatus from the vertical as determined from trace 72 the position of the stratum may be computed using the apparatus of the present invention.

For convenience in calibrating the device it is desirable to construct the model on a scale proportioned to the dimensions of the well logging device that has been used in making the records from which the calibrations of the true dips are to be made. For example, a scale of $\frac{3}{16}$ could be used. This would mean that the scale markings on the scales 27 on each of the radius beams 19 would read $1\frac{6}{3}$ of the actual horizontal distance of the mark from the center line of mast 42 of the instrument. Similarly the vertical scales 36 on each of the rider shafts 33 would be marked off on the basis of $\frac{3}{16}''=1''$.

It should be noted here that a slight source of error exists in the embodiment described in that the inherent vertical displacement of the free ends of profiling arms as they move outwardly from a well logging instrument to which the arms are pivotally attached has been ignored. The error thus introduced is negligible for small angles of dip, however. Nevertheless a more accurate instrument can be constructed by substituting for the radius beam, rider and rider arm assembly shown a parallel linkage arm arrangement for adjusting the lateral displacement of the rider members; for example, the arrangement comprising rotatable plate support 9, radius scale plates 10, linkage arms 15 and rider members 17 described in the aforementioned copending application, Serial No. 164,308, of Alexander B. Hildebrandt and Leroy W. Ledgerwood, Jr.

The actual manipulation of the instrument is fairly simple and involves the following steps. First, all of the rider shafts 33 are set so that their scales read zero. Then plate 57 is lowered so that it rests on supports 39, which will cause the plate to assume a horizontal position with respect to mast 42. Next, pointer 51 is set to point at zero on scale 62 and azimuth plate 64 is turned so that line 67 will line up with mark 68 on ball 47. Mark 68 is so placed that it is in permanent alignment with the zero mark on compass rose 13.

The next step is to rotate plate 57 so that the vertical plane of scale plate 61 will intersect, on the side nearest scale 62, an azimuth mark on plate 64 that corresponds to the direction of borehole inclination as determined from traces 72 and 73 of chart 70. Pointer 51 is then moved so that it points to a marking on scale 62 that corresponds to the amount of borehole inclination as determined from trace 72 of chart 70, care being taken not to rotate plate 64 when moving the pointer.

Plate 57 is now raised a sufficient amount so that latch 45 will engage notch 44 on mast 42. Each of the displacement rider members 25 is moved along its radius beam 19 and set at a distance as indicated on scale 27 that corresponds to the indicated horizontal displacement of one of the profiling arms of the well logging instrument as determined from traces 74, 75 and 76 on record paper 70. The riders are locked in place by means of knobs 30. Then each of the rider shafts 33 is moved vertically a distance corresponding to the indicated vertical distance between a horizontal plane of reference and the points of contact of each of the profiling arms of the well logging instrument with a particular stratum as determined from traces 74, 75 and 76. The shafts are then locked in place by means of knobs 35.

Latch 45 is now released so that plate 57 may be lowered until it rests on support points 39. Locking knob 22 is turned to release the radius beam assembly and the latter is turned about shaft 15 until pointer 31 is placed above the azimuth marking on compass rose 13 that corresponds to the orientation of one of the profiling arms of the well logging instrument as determined from trace 73 on chart 70. The settings of the particular rider 25 and rider shaft 33 that are directly over pointer 31 on the computing instrument will, of course, be those determined for the well logging profiling arm whose orientation is known. Pointer 31 is fixed at the proper position by tightening knob 22.

Plate 57 is now rotated until pointer 51 comes directly under scale 62. The amount of true dip can then be read on scale 62 from the position of pointer 51, and the direction of true dip can be read from the mark on scale 65 that is intersected by the vertical plane of scale plate 61.

It will be noted that compass rose 13 is marked off in angular degrees in a counterclockwise direction rather than in the familiar clockwise direction. The reason for this is that the well logging data indexed into the computer for each profile arm are in inverse relation to the sequence in which they were obtained by the instrument in the well. This results from the fact that in the computer the rider members 25 and shafts 33 are mechanically analogous to profiling arms that are pivotally attached at their lower ends to a well logging instrument, whereas in the well logging device for which the specific embodiment of the computer herein described has been designed, the profiling arms are pivoted at their upper ends, as described in the aforementioned Boucher application, Serial No. 90,324. Hence, when one looks at the computer from the top it is analogous to looking at the well logging device upwardly from the bottom.

It is not intended that this invention be limited to the specific embodiments herein described, for obvious modifications thereof can be made by persons skilled in this particular art without departing from the spirit of the invention, whose scope is defined in the following claims.

What is claimed is:

1. A device for computing the angle and direction of true dip of a subsurface stratum encountered by a borehole from indicia relating displacement of at least three uniformly spaced profiling arms in contact with the walls of the borehole with respect to the center thereof, the azimuthal orientation of one of said arms and the direction and extent of inclination of said arms from the vertical, comprising: a base, an azimuthal scale positioned in a horizontal plane on said base, a rotatable member supported on said base with its center of rotation coincident with the center of said scale, indexing means relating the position of said rotatable member to said azimuthal scale, at least three vertically extendable arms, means supporting said arms vertically in vertical planes equally spaced radially about said center of rotation, said last named supporting means being supported by said rotatable member and adapted for lateral motion with respect to said center of rotation while maintaining said arms at all times in a vertical position, a central vertical shaft supported by said base over said center of rotation, fixed against rotation with respect to said base but adapted for vertical slidable movement with respect thereto, a first circular plate pivotally attached to said vertical shaft for multidirectional movement into a plurality of planes each of which embraces the same fixed point on the center line of said vertical shaft, a pointer member held adjacent its lower end for pivotal movement on a fulcrum coincident with said last named fixed point, a second circular plate fixed to said pointer adjacent its upper end and perpendicular thereto and provided with an azimuthal scale, and a semicircular plate attached to said first circular plate in a plane perpendicular to said first circular plate and passing through the center thereof, said semicircular plate having a central opening of sufficient size to clear said pointer and said second circular plate, said extendable arms being provided with scales indicative of vertical extension from a selected datum point, said rotatable member carrying scales indicative of lateral displacement of said vertically extendable arms from said center of rotation, and said semicircular plate being provided with a scale accessible to said pointer indicative of the dihedral angle formed by a horizontal plane and the plane of repose of said first circular plate.

2. Device according to claim 1 including means for locking said rotatable member against rotation.

3. Device according to claim 1 including means for locking said central vertical shaft in vertically extended position.

4. Device according to claim 1 including sight guide means on said second circular plate for aligning a selected point on its azimuthal scale with a selected point on the azimuthal scale on said base.

5. A device for computing the angle and direction of true dip of a subsurface stratum encountered by a borehole from indicia relating displacement of at least three uniformly spaced profiling arms in contact with the walls of the borehole with respect to the center thereof, the azimuthal orientation of one of said arms and the direction and extent of inclination of said arms from the vertical, comprising: a base, an azimuthal scale positioned in a horizontal plane on said base, a rotatable member supported on said base with its center of rotation coincident with the center of said scale, indexing means relating the position of said rotatable member to said azimuthal scale, at least three vertically extendable arms, means supporting said arms vertically in vertical planes equally spaced radially about said center of rotation, said last named supporting means being supported by said rotatable member and adapted for lateral motion with respect to said center of rotation while maintaining said arms at all times in a vertical position, a central vertical shaft supported by said base over said center of rotation, fixed against rotation with respect to said base but adapted for vertical slidable movement with respect thereto, a spherical member fixed to said vertical shaft adjacent its upper end, a first circular plate provided with a central opening embracing said spherical member, means slidably engaging said spherical member and holding said circular plate for multidirectional movement into a plurality of planes each of which embraces the center of said spherical member, a pointer member held adjacent its lower end for pivotal movement on a fulcrum coincident with the center of said spherical member, said spherical member having a suitable opening to receive said pointer member, a second circular plate fixed to said pointer adjacent its upper end and perpendicular thereto and provided with an azimuthal scale, and a semicircular plate attached to said first circular plate in a plane perpendicular to said first circular plate and passing through the center thereof, said semicircular plate having a central opening of sufficient size to clear said pointer and said second circular plate, said extendable arms being provided with scales indicative of vertical extension from a selected datum point, said rotatable member carrying scales indicative of lateral displacement of said vertically extendable arms from said center of rotation, and said semicircular plate being provided with a scale accessible to said pointer indicative of the dihedral angle formed by a horizontal plane and the plane of repose of said first circular plate.

6. A device for computing the angle and direction of true dip of a subsurface stratum encountered by a borehole from indicia relating displacement of at least three uniformly spaced profiling arms in contact with the walls of the borehole with respect to the center thereof, the azimuthal orientation of one of said arms and the direction and extent of inclination of said arms from the vertical, comprising: a base, an azimuthal scale positioned in a horizontal plane on said base, a rotatable member supported on said base with its center of rotation coincident with the center of said scale, at least three horizontal arms fixed to said rotatable member and lying in vertical planes equally spaced radially about said center of rotation, an index pointer on one of said horizontal arms adjacent said azimuthal scale, a rider member slidably fitted on each of said horizontal arms, locking means for each of said rider members, a vertically extendable shaft held vertically by each of said rider members, means for locking each of said vertically extendable shafts in a selected vertical position, a central vertical shaft supported by said base over said center of rotation, fixed against rotation with respect to said base but adapted for vertical slidable movement with respect thereto, a spherical member fixed to said vertical shaft adjacent its upper end, a first circular plate provided with a central opening embracing said spherical member, means slidably engaging said spherical member and holding said circular plate for multidirectional movement into a plurality of planes each of which embraces the center of said spherical member, a pointer member held adjacent its lower end for pivotal movement on a fulcrum coincident with the center of said spherical member, said spherical member having a suitable opening to receive said pointer member, a second circular plate fixed to said pointer adjacent its upper end and perpendicular thereto and provided with an azimuthal scale, and a semicircular plate attached to said first circular plate in a plane perpendicular to said first circular plate and passing through the center thereof, said semicircular plate having a central opening of sufficient size to clear said pointer and said second circular plate, said horizontal arms having scales indicative of horizontal displacement of said rider members from said center of rotation, each of said vertically extendable shafts having a scale indicative of vertical extension from a selected datum point, and said semicircular plate being provided with a scale accessible to said pointer indicative of the dihedral angle formed by a horizontal plane and the plane of repose of said circular plate.

ALEXANDER B. HILDEBRANDT.

REFERENCES CITED

The following references are of record in the file of this patent:

UNITED STATES PATENTS

| Number | Name | Date |
|---|---|---|
| 1,921,508 | Dawson | Aug. 8, 1933 |
| 2,149,715 | Pearson | Mar. 7, 1939 |
| 2,149,716 | Beattie | Mar. 7, 1939 |
| 2,186,677 | Humphreys | Jan. 9, 1940 |
| 2,357,617 | Subkow et al. | Sept. 5, 1944 |
| 2,489,566 | Engle | Nov. 29, 1944 |
| 2,496,422 | Subkow | Feb. 7, 1950 |